United States Patent
Hein et al.

[15] 3,686,297
[45] Aug. 22, 1972

[54] β,β,β'-TRICHLORO-α-HYDROXY-ISO-BUTYRIC ACID

[72] Inventors: Richard W. Hein, Ridgefield; Herman A. Bruson, Woodbridge, both of Conn.

[73] Assignee: Eschemco Corporation, Allentown, Pa.

[22] Filed: June 18, 1970

[21] Appl. No.: 57,894

Related U.S. Application Data

[62] Division of Ser. No. 742,534, July 5, 1968, Pat. No. 3,575,830.

[52] U.S. Cl. ............................................. 260/535 H
[51] Int. Cl. ............................................. C07c 59/04

[58] Field of Search ...................... 260/539 R, 535 H

[56] References Cited

UNITED STATES PATENTS

| 2,951,754 | 9/1960 | Bishop | 260/539 R |
| 2,823,232 | 2/1958 | Wilson | 260/539 R |

*Primary Examiner*—Lorraine A. Weinberger
*Assistant Examiner*—John F. Terapane
*Attorney*—Louis F. Reed

[57] ABSTRACT

A process for the beta-chlorination of α-hydroxyisobutyric acid by treating it with chlorine gas in the presence of light.

1 Claim, No Drawings

β,β,β'-TRICHLORO-α-HYDROXY-ISO-BUTYRIC ACID

This application is a division of our copending application Ser. No. 742,534, filed July 5, 1968, now U.S. Pat. No. 3,575,830.

The process of the present invention relates to the beta-chlorination of α-hydroxyisobutyric acid.

It is known to prepare beta-chlorinated derivatives of α-hydroxyisobutyric acid by various methods. One process utilizes chlorinated acetone and hydrocyanic acid. A second process involves the chlorination of trichloropyruvic acid followed by reaction with methyl Grignard reagent. These procedures involve several steps, including hydrolysis, which decrease the overall yield and increase the manufacturing costs.

It is, accordingly, an object of the present invention to provide a process for the preparation of beta-chlorinated derivatives of α-hydroxyisobutyric acid without the disadvantage of prior art methods.

It is a further object of the present invention to provide a simple, direct, one-step process for the preparation of beta-chlorinated derivatives of α-hydroxisobutyric acid.

Other and further objects of the present invention will be apparent to those skilled in the art from reading the present disclosure.

Beta-chlorinated derivatives of α-hydroxyisobutyric acid have a wide variety of uses. For example, β-chloro-α-hydroxyisobutyric acid is a strong local anesthetic. The beta-chlorinated derivatives also find utility as intermediates for a number of final products. For example, the benzyl ester of β-chloro-α-hydroxyisobutyric acid is a strong local anesthetic and has germicidal and fungicidal properties.

In accordance with the present invention it has been discovered surprisingly that α-hydroxyisobutyric acid can be beta-chlorinated in a one-step process. Chlorine gas is brought into contact with the acid in the presence of direct light. It is quite unexpected that chlorination takes place on the beta carbon with the tertiary hydroxyl group remaining intact and with no α-chloroisobutyric acid or oxidation products being formed.

When lactic acid is reacted with bromine in the presence of light, oxidation is the observed reaction. See R. M. Purkayastha, *J. Indian Chem. Soc.*, Vol. 7, pp 991–6 (1930). Strell, in *Vom Wasser*, Vol. 14, pp 187–215 (1939–1940) teaches that when lactic acid is reacted with aqueous chlorine the reaction products are the oxidation products: pyruvic, glutonic and saccharic acids. No chlorination was obtained. Hence, it is surprising that chlorination of a homologue of lactic acid can be made. It is further unexpected that no α-chloroisobutyric acid is produced in view of the formation of large amounts of hydrochloric acid in the reaction, since it is well known that the addition of hydrochloric acid to tertiary butyl alcohol easily produces a conversion to tertiary butyl chloride. Thus, it is quite surprising that the tertiary hydroxy group in α-hydroxyisobutyric acid is so inert that it takes no part in the reaction.

The main sequential reactions in the present system are believed to take place according to the following equations:

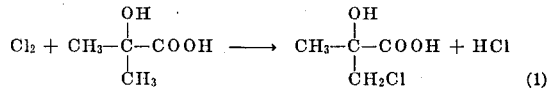

(1)

and

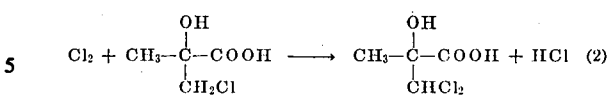

Another major product produced in the reaction is α(α'-hydroxyisobutyroxy) isobutyric acid.

Some minor products of the reaction that have been isolated include: β,β'-dichloro-α-hydroxyisobutyric acid β,β,β'-trichloro-α-hydroxyisobutyric acid (which is useful as a flame retardant agent), and α(α'-hydroxy-β'-chloroisobutyroxy) isobutyric acid.

It has been found that the chlorination should desirably be performed in the liquid phase. Thus, for temperatures below the melting point of α-hydroxyisobutyric acid (79° C.), a solvent should be used. The rate of chlorination tends substantially to decrease at temperatures below 20° C. As the temperature increases, reaction (2) takes place more readily. At high temperatures, above 200° C., α-hydroxyisobutyric acid and its chlorinated derivatives will easily esterify to linear dimers. The temperature must be below the boiling point of α-hydroxyisobutyric acid (212° C.) at atmospheric pressure. Therefore, the preferred temperature range for chlorination is between about 20° C. and about 200° C. The optimum temperature range is from about 90° C. to about 130° C.

If a reaction solvent is employed, it is preferred that the α-hydroxyisobutyric acid be in sufficient quantity to saturate the solution in the solvent or, by using a concentration approaching saturation in the solvent. It is desirable to employ a reaction solvent which will dissolve sufficient α-hydroxyisobutyric acid to provide a solution containing at least 20 percent of the starting material at the reaction temperature.

A catalyst has been found to be necessary to effect chlorination. In a preferred embodiment, direct light is utilized for catalysis. It is not necessary that the direct light contain a high percentage of ultraviolet light. As indicated in the examples, infra, the reaction takes place with light transmitted through Pyrex (opaque to light waves below about 3,000A.) and through Vycor 07910 (opaque to waves below about 2,300A.). In another example, infra, light emitted from an incandescent bulb, which transmits very little light below about 3,500A., was found to be sufficient for catalysis. In general, light of a wavelength of 1,800A. to 8,000A. is desirable, with preferred results obtained with wavelengths of 2,500A. to 3,700A.

The presence of large amounts of solvent has been discovered to be undesirable. When water is added, the conversion to chlorinated products is lowered. In addition, the selectivity to polychlorinated derivatives such as β, β-dichloro-α-hydroxyisobutyric acid is decreased. It is assumed that the presence of other solvents would have a similar effect.

In a preferred embodiment, fractional distillation is utilized as the means of separation of the chlorinated products. The α-hydroxyisobutyric acid and the β-chloro-α-hydroxyisobutyric acid may be isolated by fractional distillation, although the high melting point of β-chloro-α-hydroxyisobutyric acid (110° C.) complicated the distillation.

To avoid the above complication in fractionating, the mixtures may be esterified with methanol before fractionation. The methyl esters of β-chloro-α-hydroxyisobutyric acid were easily isolated.

Selectivity as used hereinafter means conversion of α-hydroxyisobutyric acid to a particular chlorinated product based on the total amount of α-hydroxyisobutyric acid taking part in the reaction.

In order more clearly to disclose the nature of the present invention, specific examples of the practice of the invention are herein given. It should be understood, however, that this is done by way of example and is intended neither to delineate the scope of the invention nor limit the ambit of the appended claims. Parts are expressed in terms of parts by weight, unless otherwise expressed.

EXAMPLE 1

Chlorine (0.716 g.-atoms) was slowly bubbled through molten α-hydroxyisobutyric acid (0.206 moles) at 102°–106° C. over a period of 53 minutes in a Pyrex vessel. A Hanovia high-pressure, quartz, mercury-vapor lamp No. 654A (200 watts) was placed next to the reaction vessel. The mercury lamp was in a quartz, water-cooled cold finger.

A 74 percent conversion of α-hydroxyisobutyric acid resulted in selectivities of 65 percent β-chloro-α-hydroxyisobutyric acid and 15 percent β, β-dichloro-α-hydroxyisobutyric acid.

EXAMPLE 2

Chlorine (0.665 g.-atoms) was slowly through molten α-hydroxyisobutyric acid (0.197 moles) at 97°–101° C. over a period of 52 minutes in a Vycor 07910 vessel. A Hanovia lamp was used as cited in Example 1. A 72 percent conversion of α-hydroxyisobutyric acid resulted in selectivities of 70 percent β-chloro-α-hydroxyisobutyric acid and 18.3 percent, β, β-dichloro- α-hydroxyisobutyric acid.

EXAMPLE 3

Chlorine (0.680 g.-atoms) was slowly bubbled through a 63 percent solution of α-hydroxyisobutyric acid in water (0.195 moles of α-hydroxyisobutyric acid) at 62°–71° C. over a period of 51 minutes in a Vycor 07910 vessel. A Hanovia lamp was used as cited in Example 1. A 30 percent conversion of α-hydroxyisobutyric acid resulted in selectivities of 71 percent β-chloro-α-hydroxyisobutyric acid and 3.4 percent β, β-dichloro-α-hydroxyisobutyric acid.

EXAMPLE 4

Chlorine (0.677 g.-atoms) was slowly bubbled through an 85 percent solution of α-hydroxyisobutyric acid in water (0.213 moles) α-hydroxyisobutyric acid at 62°–76° C. over a period of 44 minutes in a Vycor 07910 vessel. A Hanovia lamp was used as cited in Example 1. A 44 percent conversion of α-hydroxyisobutyric acid resulted in selectivities of 64 percent β-chloro-α-hydroxyisobutyric acid and 2.1 percent β, β-dichloro-α-hydroxyisobutyric acid.

EXAMPLE 5

Chlorine (0.637 g.-atoms) was slowly bubbled through molten α-hydroxyisobutyric acid (0.201 moles) at 97°–102° C. over a period of 54 minutes in a Vycor 07910 vessel. A 40-watt, frosted, showcase, incandescent lamp was placed next to the reaction vessel. A 45 percent conversion of α-hydroxyisobutyric acid resulted in selectivities of 80 percent β-chloro-α-hydroxyisobutyric acid and 6.7 percent β, β-dichloro-α-hydroxyisobutyric acid.

The terms and expressions which have been employed are used as terms of description not of limitation, and there is no intention in the use of such terms and expressions of excluding any equivalents of the features shown and described or portions thereof, but it is recognized that various modifications are possible within the scope of the invention claimed.

What is claimed is:

1. The product, β,β,ββ'-trichloro-α-hydroxy-isobutyric acid.

* * * * *